(12) United States Patent
Mashak et al.

(10) Patent No.: US 9,823,106 B2
(45) Date of Patent: Nov. 21, 2017

(54) FLOW SENSOR WITH HEATED AIR COLLAR

(71) Applicant: General Electric Company, Schenectady, NY (US)

(72) Inventors: James N. Mashak, Madison, WI (US); Russell J. Kuzelka, Madison, WI (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 14/341,308

(22) Filed: Jul. 25, 2014

(65) Prior Publication Data

US 2016/0025534 A1 Jan. 28, 2016

(51) Int. Cl.
| | |
|---|---|
| G01F 1/68 | (2006.01) |
| G01F 15/14 | (2006.01) |
| G01F 1/42 | (2006.01) |
| G01F 15/02 | (2006.01) |
| G01F 1/699 | (2006.01) |
| G01F 1/40 | (2006.01) |
| G01F 15/00 | (2006.01) |
| G01F 15/18 | (2006.01) |
| G01F 1/69 | (2006.01) |

(52) U.S. Cl.
CPC .............. *G01F 15/14* (2013.01); *G01F 1/40* (2013.01); *G01F 1/42* (2013.01); *G01F 1/699* (2013.01); *G01F 15/00* (2013.01); *G01F 15/02* (2013.01); *G01F 1/69* (2013.01); *G01F 15/18* (2013.01)

(58) Field of Classification Search
CPC .......... G01F 15/02; G01F 15/14; G01F 15/18; G01F 1/69; G01F 1/699

USPC ............ 73/198, 201, 204.18, 204.22, 204.25
See application file for complete search history.

(56) References Cited

U.S. PATENT DOCUMENTS

| | | | | |
|---|---|---|---|---|
| 2,729,976 A | * | 1/1956 | Laub | G01F 1/6847 |
| | | | | 73/204.16 |
| 3,626,755 A | * | 12/1971 | Rudolph | G01F 1/42 |
| | | | | 73/861.52 |
| 3,802,264 A | * | 4/1974 | Poppendiek | G01F 1/002 |
| | | | | 73/204.24 |
| 4,425,805 A | * | 1/1984 | Ogura | G01F 1/667 |
| | | | | 600/538 |
| 4,989,456 A | | 2/1991 | Stupecky | |
| 5,033,312 A | | 7/1991 | Stupecky | |
| 5,038,621 A | | 8/1991 | Stupecky | |
| 5,693,880 A | * | 12/1997 | Maginnis, Jr. | G01F 5/00 |
| | | | | 73/202.5 |
| 6,655,207 B1 | * | 12/2003 | Speldrich | G01F 1/40 |
| | | | | 73/202.5 |
| 6,722,211 B1 | | 4/2004 | Ciobanu et al. | |
| 7,270,143 B2 | | 9/2007 | Kohlmann et al. | |

(Continued)

*Primary Examiner* — Benjamin Schmitt
(74) *Attorney, Agent, or Firm* — Boyle Fredrickson, S.C.

(57) ABSTRACT

A collar is provided for use with a fluid flow sensor to reduce condensation of a moist gas flowing through the fluid flow sensor. The collar comprises a body defining an interior that defines an airspace between the collar and the housing of the fluid flow sensor when the collar is positioned on the fluid flow sensor. The collar also includes a heat source secured to the body and adapted to heat air contained within the airspace to consequently heat the housing of the fluid flow sensor and the interior surfaces of the sensor to reduce condensation of the moist gas.

3 Claims, 4 Drawing Sheets

(56) References Cited

U.S. PATENT DOCUMENTS 7,335,164 B2 * 2/2008 Mace ................... A61B 5/083
                                                     422/84

* cited by examiner

… (continued)

FLOW SENSOR WITH HEATED AIR COLLAR

BACKGROUND OF THE INVENTION

The invention relates generally to flow sensors, and more particularly, to variable orifice fluid flow sensors.

Orifice flow sensors are used to measure the flow rates of fluids, which include liquids and gases. A typical orifice flow sensor comprises a fixed orifice through which a fluid is made to flow. A pressure difference is established between the fluid that is present upstream from the orifice and the fluid that is flowing through the orifice. This pressure difference can be used to measure the flow rate of the fluid. For this purpose, a pressure transducer measures the pressure difference that is established across the orifice, and is calibrated such that the flow rate of the fluid is calculated from this pressure difference.

Variable orifice flow sensors provide sufficient pressure difference for measurement purposes across a broad range of flow rates. This is achieved by introducing a bending member into the fluid flow passage. The bending member is mounted to the housing for the fluid flow passage and includes a flapper that is positioned across the fluid flow passage and bends or flexes in the direction of the fluid flow as a result of contact with the fluid flow, and hence creates a variable orifice within the fluid flow passage. The measurement of flow rates in a variable orifice flow sensor is similar to the measurement of flow rates in fixed orifice flow sensors. That is, a pressure transducer measures the pressure difference across the variable orifice and calculates the flow rate of the fluid from the pressure difference.

U.S. Pat. Nos. 4,989,456; 5,033,312; 5,038,621; 6,722,211 and 7,270,143 show variable orifice flow sensors.

Orifice gas flow sensors are commonly used for measuring flow rates in medical applications, such as breathing apparatuses that deliver desired quantities of breathing gases to a patient. When used to measure breathing gases or recirculating breathing gases, the gases flowing through the sensor may contain moisture.

In the case where a gas flowing through a variable orifice flow sensor includes moisture, the moisture may condense and form liquid droplets that may accumulate in the sensor, which can produce problems with consistent and repeatable operation of the sensor, such as by interfering with the flexing of the flapper, thereby impacting the accuracy of the results obtained by the sensor.

BRIEF DESCRIPTION OF THE INVENTION

In the present invention a fluid flow sensor is provided having a housing defining a fluid flow passage through the sensor. A collar is disposed around the housing for the fluid flow sensor to define an airspace between the collar and the housing. A heating element is disposed in the airspace and is operable to heat the air contained within the airspace to consequently heat the fluid flow passage above the dew point of the moist gas to correspondingly reduce condensation of the fluid flow within the fluid flow sensor.

DETAILED DESCRIPTION OF THE INVENTION

Figure 1:
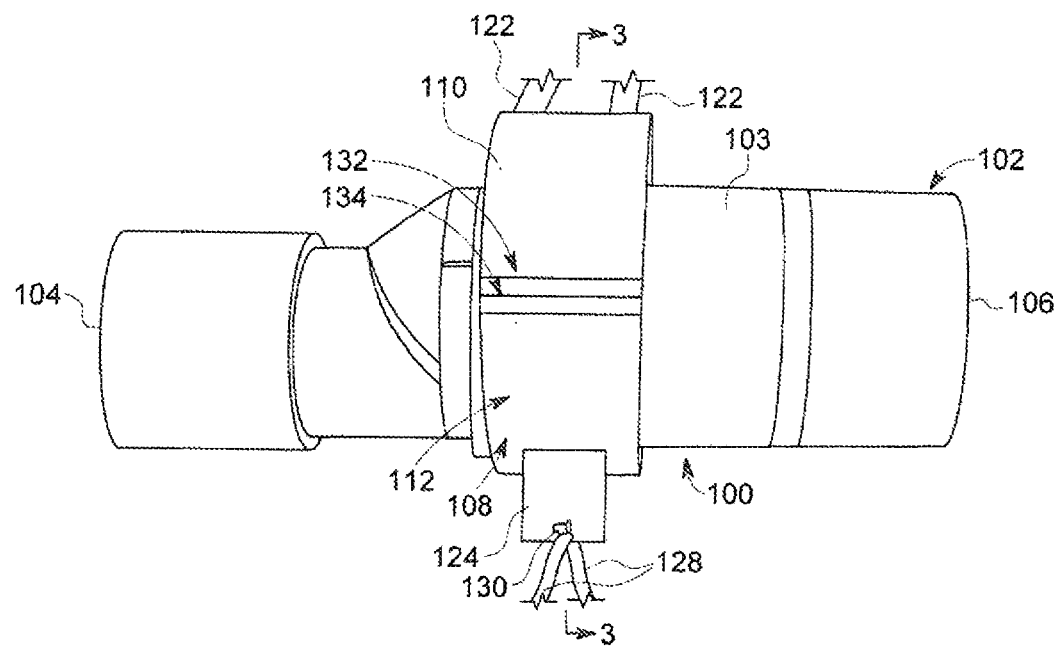
FIG. 1 is an isometric view of a fluid flow sensor and collar in accordance with an exemplary embodiment of the invention.

FIG. 1 illustrates an isometric view of a fluid flow sensor 100 in accordance with one embodiment of the present invention. Fluid flow sensor 100 is used to measure flow rates of fluids, such as moist gases, flowing through the fluid flow sensor 100, for example, by developing pressure differences within the fluid flow sensor 100 that are used to measure flow rates of the fluids. Fluid flow sensor 100 has a generally cylindrical configuration. However, fluid flow sensor 100 may be formed in a variety of shapes and sizes and still lie within the scope of this invention.

Figure 2:
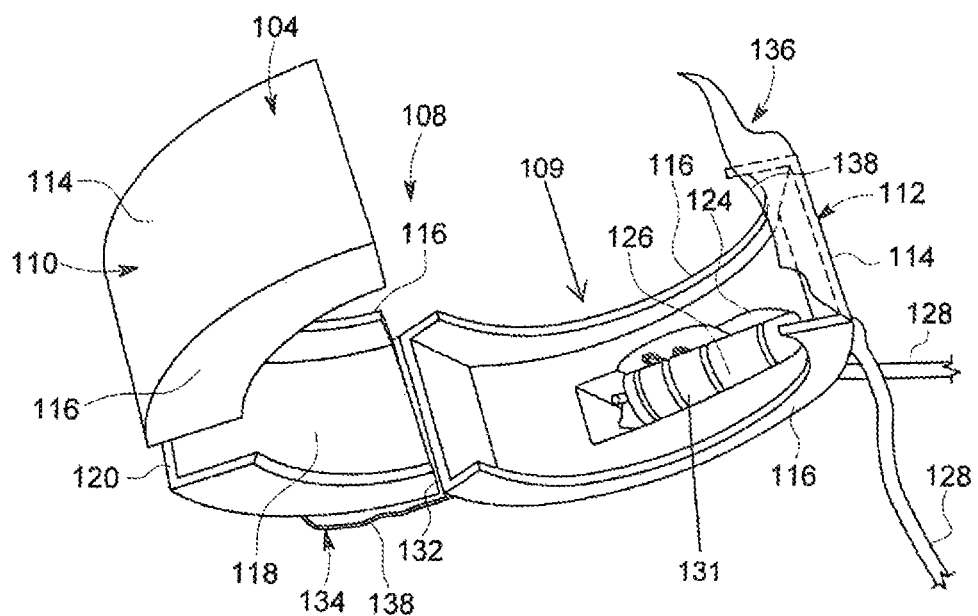
FIG. 2 is an isometric view of a collar in accordance with an exemplary embodiment of the invention
Figure 3:
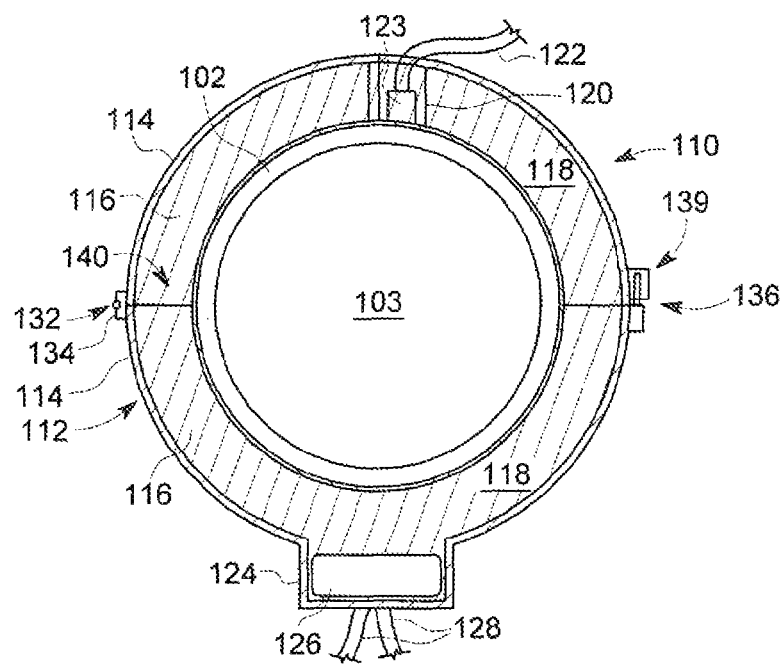
FIG. 3 is a cross sectional view of a fluid flow sensor and collar in accordance with an exemplary embodiment of the present invention.

FIGS. 1-3 illustrate an exemplary embodiment of the fluid flow sensor 100 comprising a housing 102 that defines a fluid flow passage 103 therethrough having an inlet end 104 and an outlet end 106. When fluid flow sensor 100 is used for measuring gas flow rates in a breathing apparatus, the fluid flow sensor 100 is inserted at one or more desired locations in a breathing circuit where the breathing gas is introduced into the housing 102 of the fluid flow sensor 100 through the inlet end 104 to pass through the fluid flow passage 103 and exit though the outlet end 106 to continue through the breathing circuit. The measurements made to determine the flow rate of the gas passing through the fluid flow sensor 100 are made as the gas passes through fluid flow passage 103 in the housing 102 from the inlet end 104 to the outlet end 106.

Disposed around the housing 102 of the fluid flow sensor 100 is a collar 108. FIG. 2 shows the collar 108 comprising a body 109 including a first portion 110 and a second portion 112. Collar 108 can be configured to cover some or all of the exterior of the housing 102 in order to heat the interior surfaces of the fluid flow passage 103 of the housing 102. First portion 110 and second portion 112 of the collar 108 are each formed of a suitable material, such as a plastic material, and include an outer wall 114, a pair of side walls 116 extending along and outwardly from opposed sides of the outer wall 114 to define an interior 118 within the first portion 110 and second portion 112. The first portion 110 also defines a number of channels 120 that extend through the outer wall 114 and/or side walls 116 to enable tubes or hoses 122 or other items to be connected to the measurement ports 123 (FIG. 3) on the housing 102 of the fluid flow sensor 100 through the first portion 110 to allow determination of the fluid flow rate of the gas passing through the sensor 100.

Second portion 112 is formed with a recess 124 extending outwardly from the outer wall 114 in a direction generally opposite the side walls 116. Recess 124 is shaped to receive a heat source 126 therein, which is connected via wires 128 extending through apertures 130 in the recess 124 to a suitable power source and/or controller (not shown) for operation of the heat source 126. Heat source 126 can take any suitable form, and in the illustrated exemplary embodiment is formed of a resistive heating element or coil 131.

First portion 110 and second portion 112 are joined to one another at one end by a suitable connector 132. Connector 132 enables the first portion 110 and second portion 112 to be moved apart from one another to enable placement of the collar 108 around the housing 102 of the fluid flow sensor 100. The connector 132 can take any suitable shape or configuration and can enable first portion 110 and second portion 112 to be completely separated from one another. In the exemplary embodiment of FIGS. 1-3, the connector 132 is formed as a hinge 134, formed of adhesive tape or other suitable hinge structure, engaged with adjacent ends of first portion 110 and second portion 112 to enable pivoting movement of first portion 110 and second portion 112 relative to one another.

Opposite hinge 134, the collar 108 includes a securing member 136 capable of releasably engaging the ends of first portion 110 and second portion 112 with one another. Securing member 136 can take any suitable form or configuration, such as a detent disposed on first portion 110 engagable with a recess on second portion, and in the exemplary embodiment of FIG. 2, securing member 136 takes the form of a piece of adhesive tape 138 placed over and releasably engaged with adjacent ends of first portion 110 and second portion 112, while in FIG. 3, the securing member is illustrated in the exemplary embodiment as a mechanical securing mechanism 139.

In operation, first portion 110 and second portion 112 are separated from one another using the connector 132 to allow placement of collar 108 around housing 102 of fluid flow sensor 100. First portion 110 and second portion 112 are subsequently moved towards one another to enable securing member 136 to secure first portion 110 and second portion 112 to one another opposite connector 132. In this position, tubes 122 are connected to housing 102 and routed through ports 120 in first portion 110 to enable proper operation of fluid flow sensor 100. Engagement of securing member 136 positions first portion 110 and second portion 112 of collar 108 around the housing 102 such that the ends of outer walls 114 and side walls 116 of first portion 110 and second portion 112 are positioned adjacent one another to enable interiors 118 of first portion 110 and second portion 112 to form an enclosed airspace 140 between collar 108 and housing 102.

In this position, heat source 126 can be operated to heat the air within the airspace 140 to a desired temperature. Heating of the air in the airspace 140 efficiently utilizes the heat from the heat source 126 to consequently heat the entire perimeter of the portion of the housing 102 in contact with the airspace 140 without any direct contact of the heat source 126 with the housing 102. Heating of the housing 102 in this manner heats the interior surfaces of the fluid flow passage 103 defined within the housing 102. This significantly reduces and can prevent any condensation of moisture contained in the moist gas as it flows along the fluid flow passage 103 to the outlet end 106. This mode of heating the interior surfaces of the fluid flow passage utilizes less energy or power as the heat source 126 is only directly heating the air within the airspace 140, and not the material forming the housing 102 for the fluid flow sensor 100.

When it is desired to remove and either replace or sterilize the fluid flow sensor 100, the collar 108 can be removed from the housing 102 by disengaging the securing member 136 and displacing the first portion 110 and second portion 112 away from one another. The fluid flow sensor 100 can then be cleaned, sterilized and/or replaced and the collar 108 can be re-attached to the fluid flow sensor 100 for further use, as the collar 108 does not contact the sterile fluid flow passage 103 of the fluid flow sensor 100, and does not require sterilization.

In alternative exemplary embodiments, various sealing elements (not shown) can be secured to the edges of one or more of the outer walls 114 and/or the side walls 116 of first portion 110 and second portion 112 of the collar 108 to engage the housing 102 and/or the walls 114, 116 of the other portion 110, 112 to more effectively retain air heated by the heat source 126 within the airspace 140 and consequently more efficiently heat the interior surfaces of the fluid flow passage 103.

Figure 4:
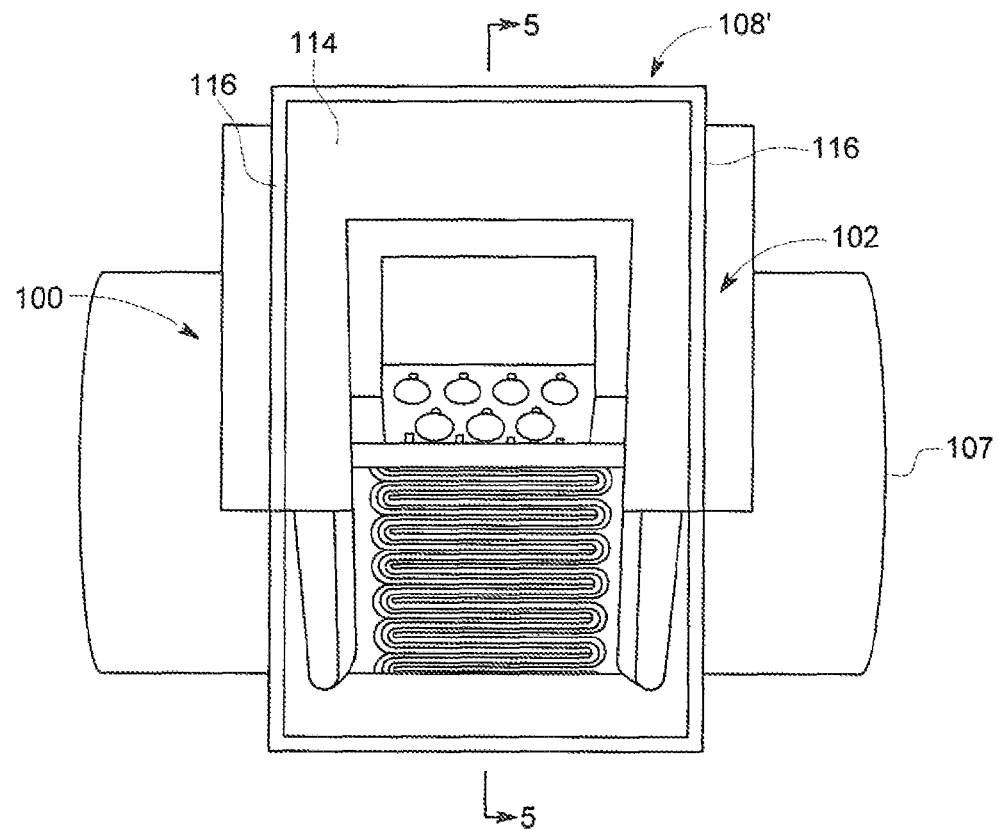
FIG. 4 is an isometric view of a fluid flow sensor and collar in accordance with another exemplary embodiment of the invention.
Figure 5:
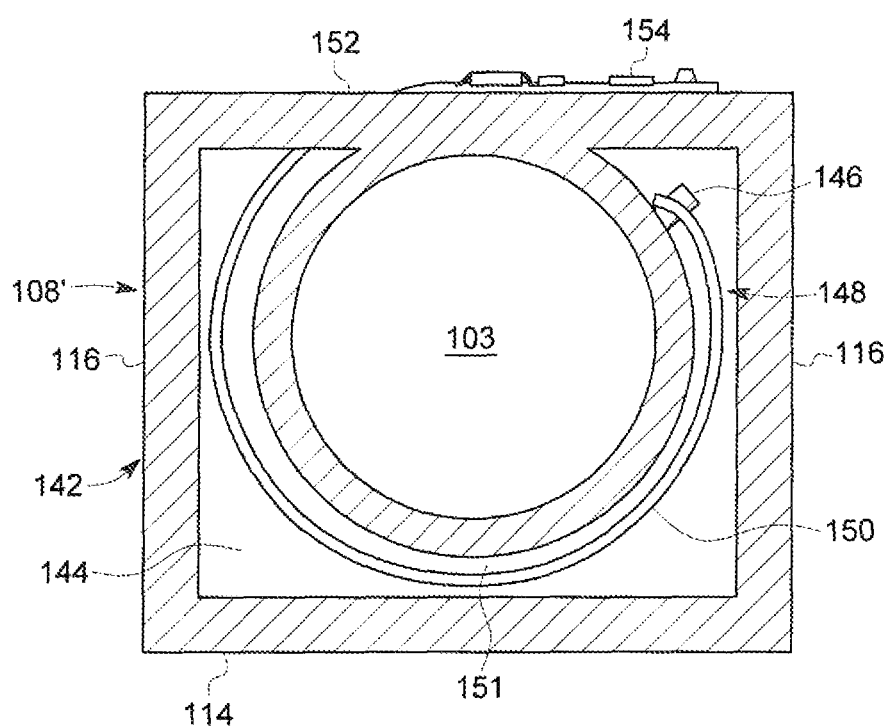
FIG. 5 is a cross sectional view of a fluid flow sensor and collar in accordance with another exemplary embodiment of the invention.
Figure 6:
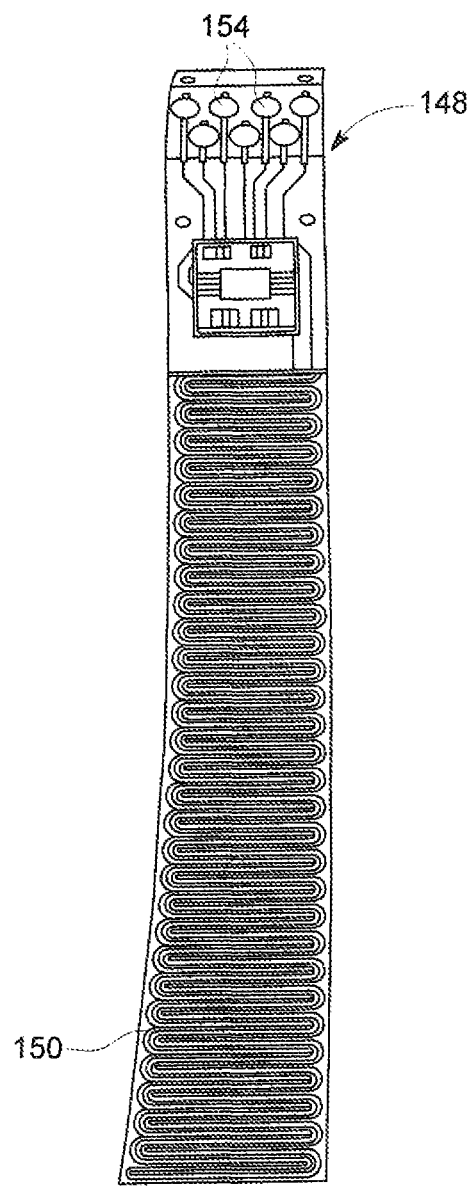
FIG. 6 is an isometric view of a heat source in accordance with another exemplary embodiment of the invention.

FIGS. 4-6 show another exemplary embodiment of the invention in which the collar 108 has outer wall 114 and side walls 116 formed as an enclosure 142 secured directly to and positioned around a portion of the housing 102 to form a completely enclosed airspace 144 between the housing 102 and the enclosure 142. The enclosure 142 can have any desired shape and configuration, and in the exemplar) illustrated embodiment is integrally formed with the housing 102 with outer wall 114 and side walls 116 such that the enclosure 142 and housing 102 form a single component for the fluid flow sensor 100.

The housing 102 includes a connection and spacing post 146 disposed on and extending outwardly from the exterior of the housing 102 to which is secured one end of a heat source 148. The heat source 148 can be formed of any suitable heating element(s), similar to heat source 126. In the exemplary illustrated embodiment the heat source 148 is formed of a resistive strip heating element 150. The strip heating element 150 is spaced a distance from the housing 102 by the post 146 to avoid direct contact with the housing 102 to maximize the ability and efficiency of the strip heating element 150 in heating the air within airspace 144. Strip heating element 150 wraps around housing 102 within enclosure 142 while maintaining a minimum space 151 between strip heating element 150 and housing 102 and extends through an aperture 152 in enclosure 142. The portion of strip heating element 150 positioned outside of enclosure 142 includes one or more electrical contacts 154 that are operably connected to a power source (not shown) and controller (not shown) in order to enable and control operation of the strip heating element 150 to heat the air within the airspace 144.

The various exemplary embodiments of the invention provide a collar 108 that can be retrofit onto or incorporated within the structure of a fluid flow sensor 100 and that is capable of heating the interior surfaces of the fluid flow sensor 100 to reduce condensation from the moist gas within the fluid flow sensor 100. In an alternative exemplary embodiment of the invention, the heat source 126 could be spaced from the collar 108 such that the air heated by the heat source 126 could be directed into the airspace 140 defined within the collar 108 along a tube or other conduit-like member (not shown) in order to provide the heated air to the airspace 140 within the collar 108. In still, another exemplary embodiment of the invention, the collar 108 could be formed of a flexible material that can be inflated by the introduction of the heated air into the airspace 140 defined between the collar 102 and the housing 102 of the fluid flow sensor 100.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A collar adapted for use with a fluid flow sensor to reduce condensation of a moist gas flowing through the fluid flow sensor, the collar comprising:
   a) a body defining an interior that is adapted to define an airspace with the fluid flow sensor when the body is positioned on the fluid flow sensor; and
   b) a heat source positioned within the interior of the body and adapted to heat air contained within the airspace, wherein the body is fixed to the fluid flow sensor and wherein the heat source is secured at one end to a post disposed on the fluid flow sensor.

2. The collar according to claim 1 wherein the heat source is positioned around the fluid flow sensor.

3. The collar of claim 2 wherein the heat source is spaced from the fluid flow sensor along its entire length.

\* \* \* \* \*